(12) United States Patent
Liang (10) Patent No.: US 11,922,262 B2
(45) Date of Patent: Mar. 5, 2024

(54) PHOTOMASK INSPECTION SYSTEM AND METHOD

(71) Applicant: ChangXin Memory Technologies, Inc., Hefei (CN)

(72) Inventor: Xueyu Liang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 196 days.

(21) Appl. No.: 17/715,632

(22) Filed: Apr. 7, 2022

(65) Prior Publication Data

US 2023/0138028 A1    May 4, 2023

(30) Foreign Application Priority Data

Nov. 3, 2021    (CN) .......................... 202111294569.X (51) Int. Cl.
*G06K 7/10*    (2006.01)
*G06K 7/14*    (2006.01)

(52) U.S. Cl.
CPC ....... *G06K 7/10821* (2013.01); *G06K 7/1413* (2013.01)

(58) Field of Classification Search
CPC .......................... G06K 7/10821; G06K 7/1413
USPC ............................... 235/462.01, 462.43, 486
See application file for complete search history.

(56) References Cited

U.S. PATENT DOCUMENTS

| 6,414,744 | B1 * | 7/2002 | Kuiper | ................ | G03F 7/70741 |
|           |      |        |        |                 | 414/935 |
| 2003/0197848 | A1 * | 10/2003 | Shiraishi | ............. | G03F 7/70708 |
|           |      |        |        |                 | 250/548 |
| 2007/0122920 | A1 * | 5/2007 | Bornstein | ........... | H01L 21/3213 |
|           |      |        |        |                 | 700/121 |

FOREIGN PATENT DOCUMENTS

| CN | 109407479 A | 3/2019 |
| CN | 110658687 A | 1/2020 |

* cited by examiner

*Primary Examiner* — Paultep Savusdiphol
(74) *Attorney, Agent, or Firm* — Alston & Bird LLP (57) ABSTRACT

The present disclosure provides a photomask inspection system and an inspection method. The mask inspection system includes: a mask thickness measuring device having sensor modules arranged side by side for measuring the thickness of the mask; a bar code reading device; a calibration device including a calibration rod and an electromagnet, the calibration rod includes a calibration stick and a calibration base, the electromagnet is set at the bottom of the calibration base, and the calibration device calibrates the barcode reading device.

20 Claims, 11 Drawing Sheets

PHOTOMASK INSPECTION SYSTEM AND METHOD

TECHNICAL FIELD

The present disclosure relates to the field of semiconductor technology, and in particular, to a photomask inspection system and method.

BACKGROUND

In the semiconductor preparation process, the photolithography process is an important step in the semiconductor device manufacturing. The photolithography process applies exposure to photoresist and their development to transfer the patterns from the photomask to wafers through etching process. The lithography equipment is an indispensable process equipment in realizing the lithography process, and is the core equipment for production of large-scale integrated circuits. The normal operation of the lithography equipment is a prerequisite for ensuring the semiconductor process.

In the existing lithography equipment, before a mask enters the mask storage unit of the lithography equipment, the barcode reading device of the machine will read the barcode on the mask to obtain the relevant information of the mask information to judge the authority of the mask, but when the barcode reading device of the machine fails, the barcode reading of the mask will be abnormal, which will cause some settings about the mask in the equipment to fail, resulting in the failure of the mask function. In addition, in the existing technology, when the barcode reading device of the machine has a reading abnormality, the equipment will stop running for device calibration, usually manual calibration is required, however the calibration success rate is low and the calibration time is long.

It should be noted that the information disclosed in the above background section is only for enhancement of understanding of the background of the present disclosure, and therefore may contain information that does not form the prior art that is already known to a person of ordinary skill in the art.

SUMMARY

The present disclosure provides a photomask inspection system and a method of photomask detection to overcome the above-mentioned deficiencies.

Other features and advantages of the present disclosure will become apparent from the following detailed description, or by practice of the present disclosure in part.

According to one aspect of the present disclosure, a photomask detection is provided, the device comprising:
 a thickness measurement device for masks, the thickness measurement device for masks includes a plurality of sensor modules arranged side by side, and the sensor modules are used to measure the thickness of the masks;
 a barcode reading device, the barcode reading device and the thickness measuring device for masks are disposed opposite, and the barcode reading device is used to read the barcode on the mask to obtain the mask thickness information;
 a calibration device, the calibration device includes a calibration rod and an electromagnet, the calibration rod includes a calibration stick and a calibration base, the electromagnet is arranged to relate to the bottom of the calibration base, and the calibration device is used for reading the barcode for calibration.

According to another embodiment of the present disclosure, a method for inspecting a photomask is provided, the method comprising:
 providing a thickness measurement device for masks, the thickness measurement device for masks includes a plurality of sensor modules arranged side by side, and the sensor modules are used to measure the thickness of masks;
 providing a barcode reading device, the barcode reading device reads the barcode on a photomask, and checks a preset database to determine whether the barcode is included in the database;
 providing a calibration device, the calibration device includes a calibration rod and an electromagnet, the calibration rod includes a calibration stick and a calibration base, the electromagnet is arranged be associated with the bottom of the calibration base, and the barcode reading device is calibrated by the calibration device.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Obviously, the drawings in the following description are only some embodiments of the present disclosure, and for those of ordinary skill in the art, other drawings can also be obtained from these drawings without creative efforts.

DETAILED DESCRIPTION OF THE PREFERRED EMBODIMENTS

Example embodiments will now be described more fully with reference to the accompanying drawings. Example embodiments, however, can be embodied in various forms and should not be construed as limited to the embodiments set forth herein; rather, these embodiments are provided so that this disclosure will be thorough and complete, and will fully convey the concept of example embodiments to those skilled in the art. The same reference numerals in the drawings denote the same or similar structures, and thus their detailed descriptions will be omitted. Furthermore, the drawings are merely schematic illustrations of the present disclosure and are not necessarily drawn to scale.

Although relative terms such as "upper" and "lower" are used in this specification to describe the relative relationship of one component of an icon to another component, these terms are used in this specification only for convenience, such as according to the direction of the example described. It will be appreciated that if the device of the icon is turned upside down, the components described as "on" will become the components on "bottom". When a certain structure is "on" other structures, it may mean that a certain structure is integrally formed on other structures, or that a certain structure is "directly" arranged on other structures, or that a certain structure is "indirectly" arranged on another structure through another structure. other structures.

The terms "a", "an", "the", "said" and "at least one" are used to indicate the presence of one or more elements/components/etc.; the terms "including" and "having" are used to indicate an open-ended is meant to be inclusive and means that additional elements/components/etc. may be present in addition to the listed elements/components/etc.; the terms "first", "second" and "third" etc. only used as a marker, not a limit on the number of its objects.

The lithography equipment is one of the important processing equipment in the manufacturing process of integrated circuit chips. The lithography equipment is used to transfer the design pattern of the chip from the reticle (i.e. photomask) to the photoresist on the silicon wafer surface by the exposure method. In the process of completing the manufacture of a chip, masks of different sizes are usually required to transfer different design patterns on the silicon wafer. Therefore, in the process of using the photomasks in the lithography equipment, it is necessary to identify the photomasks of different sizes to ensure that the size of the photomask can meet the size requirements of the lithography equipment. When the mask enters the mask storage unit of the lithography apparatus, the mask is not damaged due to the oversized mask.

In the lithography equipment, when the barcode reading device of the machine reads the barcode of some masks, the barcode reading device can fails. At this time, the barcode reading device will read abnormal barcode digits. The thickness of some of the masks can be much thicker than the commonly used masks due to the extra mirror or graphics on the masks. If the thickness of the mask exceeds the allowed thickness of the mask storage unit of the machine, due to abnormal barcode reading, the lithography equipment will fail, causing some structures of the machine to collide with the mask, causing damage to the mask and the machine. For example, when the barcode reading device fails, the number of digits of the barcode read on the mask may change. At this time, some permission settings of the machine to the mask will be invalid, and the machine will allow the mask of this type to enter the machine, and the thickness of the mask of this type has exceeded the maximum allowable thickness of the machine, which will cause damage to the mask of this type.

In addition, when the barcode reading device reads the mask barcode abnormally, it is necessary to calibrate the barcode reading device after the shutdown. At present, manual calibration is usually used, but this calibration method is relatively slow, and it needs to be calibrated after the device reads the barcode abnormally. It is necessary to perform judgment and calibration operations, and this calibration method cannot automatically calibrate the device and confirm the calibration results, so that the machine update cycle is long and the speed of confirming the calibration results is slow.

Therefore, the present disclosure provides a mask inspection system that can both measure the mask thickness and automatically calibrate the barcode reading device.

Figure 1:
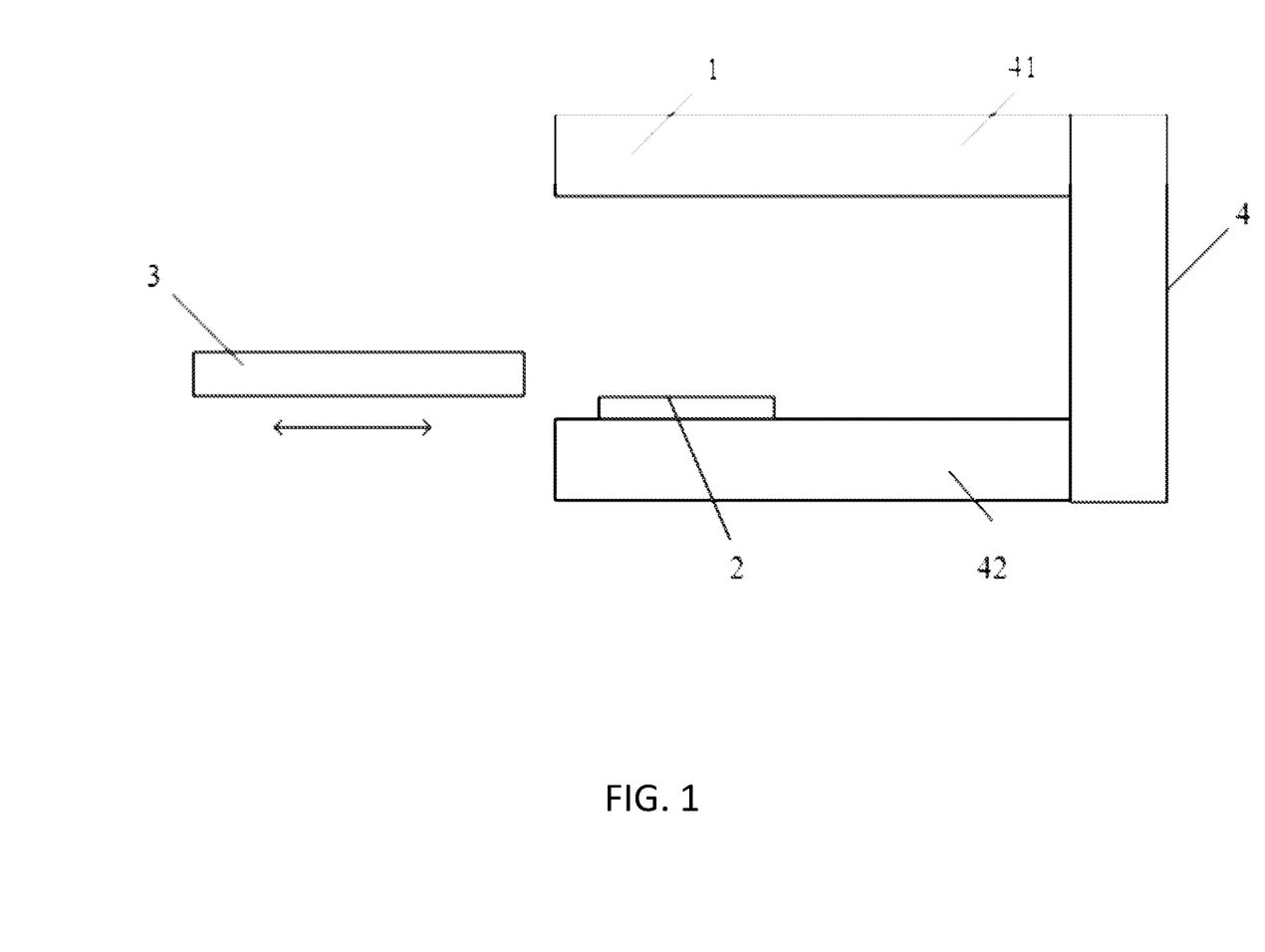
FIG. 1 is a schematic structural diagram of a photomask inspection system according to an exemplary embodiment of the present disclosure.

An embodiment of the present disclosure provides a mask inspection system. FIG. 1 is a schematic structural diagram of a mask inspection system in an exemplary embodiment of the present disclosure. As shown in FIG. 1, the mask inspection system includes: a mask thickness measuring device 1, barcode reading device 2 and calibration device 21.

The photomask thickness measuring device 1 includes a plurality of sensor modules arranged side by side, and the sensor modules are used to measure the thickness of the photomask 3.

Figure 2:
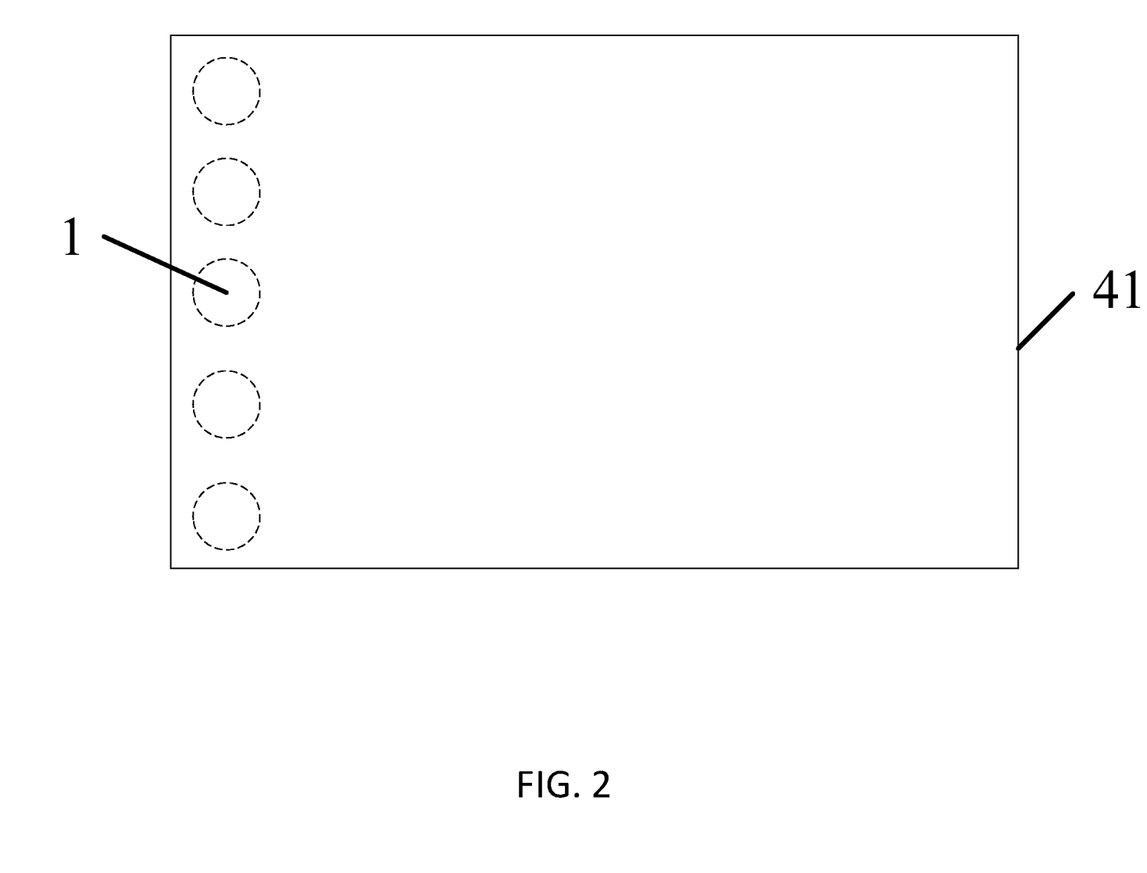
FIG. 2 is a schematic top-view structural diagram of a photomask inspection system according to an exemplary embodiment of the present disclosure.

In the embodiment of the present disclosure, as shown in FIG. 2, in conjunction with FIG. 1 and FIG. 2, a mask thickness measuring device 1 is provided at the entrance of the machine 4 of the lithography apparatus, and the mask thickness measuring device 1 is arranged on the machine 4. Located on the machine beam 41 at the entrance, the mask thickness measurement device 1 includes of multiple sensor modules. Each sensor module can also include multiple sensors. Some of the sensors can be a reflective photoelectric sensor or an ultrasonic sensor, a ranging sensor, a laser ranging sensor or an infrared ranging sensor. The specific types of the sensors are not limited in this disclosure, but they need to meet the specific needs of ranges without affecting the normal operation of the lithography equipment. The number of sensor modules can be 5 or more, and the specific number can be selected according to the width of the masks or the structure of the machine.

In some embodiments, the measured area of each sensor on the mask 3 is fixed, and the total scanning length of sensor modules arranged side by side needs to be greater than or equal to the width of the mask 3 to ensure the scanning of the sensor modules. The measured area covers the entire area of mask 3. For example, the width of the mask 3 is A, the width of the mask 3 that can be measured by a single sensor is a, and the number of set sensors is N, then, the width of mask 3 is A≤N*a. The distribution interval of the sensor module can be determined according to the measurement area of the sensor module.

When a new mask 3 enters the lithography equipment or the mask barcode is abnormally read by the barcode reading device of the machine, the mask thickness measuring device 1 in the mask inspection system is activated, and the multiple sensor modules in the mask thickness measuring device 1 scan the entire area of the new mask 3, wherein the moving direction of the mask 3 in the mask inspection system is the direction shown by the arrow in FIG. 1. The thickness corresponding to each point of the mask 3 is determined, and by comparing the thickness of each point with the maximum thickness of the mask allowed by the machine, it is judged whether the new mask 3 can enter the machine. If the thickness of each point of the new mask 3 is less than or equal to the maximum mask thickness allowed by the machine, then a new mask 3 is allowed to enter the machine. If the thickness of one or more points in the new mask 3 is greater than the maximum mask thickness allowed by the machine, then this mask is prohibited to enter the machine, and the thickness information of this mask 3 is updated into the preset database. At the same time, the permission limit is set for the forbidden mask. For example, the maximum allowable thickness of the masks in the mask storage unit of the machine is 50 mm, and the mask thickness measuring device 1 will perform thickness detection on the new mask entering the mask storage unit. If the thickness of the new mask is greater than 50 mm, the new mask is prohibited from entering the machine, and the thickness information of the new mask is updated to the machine database, and the permission limit is set at the same time.

Figure 3:
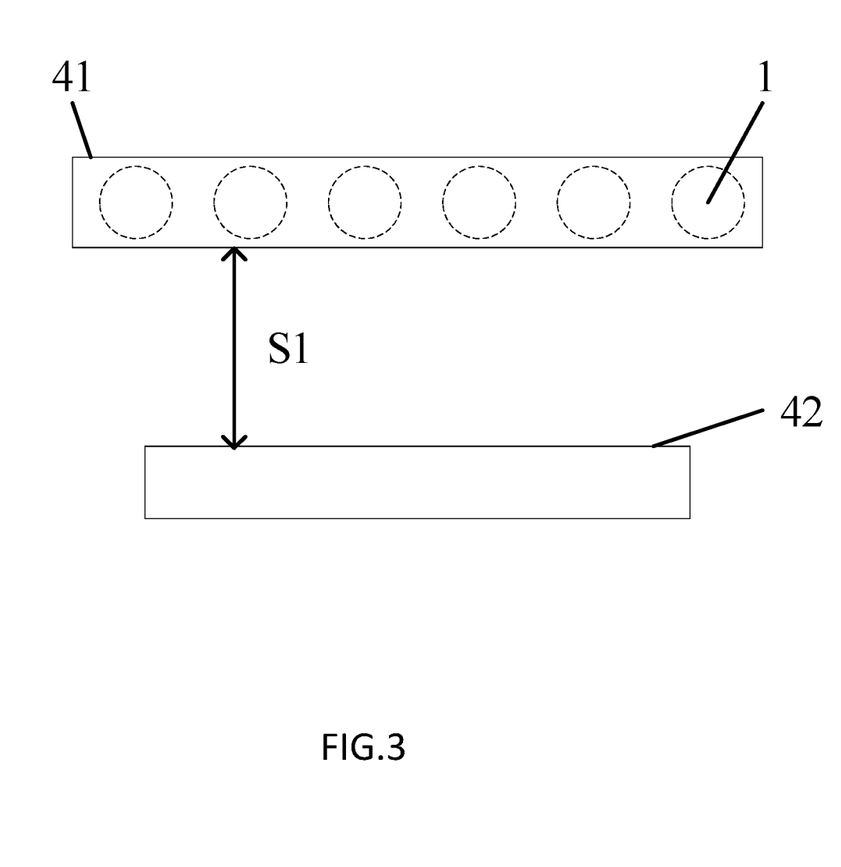
FIG. 3 is a schematic measuring diagram of a photomask thickness measurement device according to an exemplary embodiment of the present disclosure.
Figure 4:
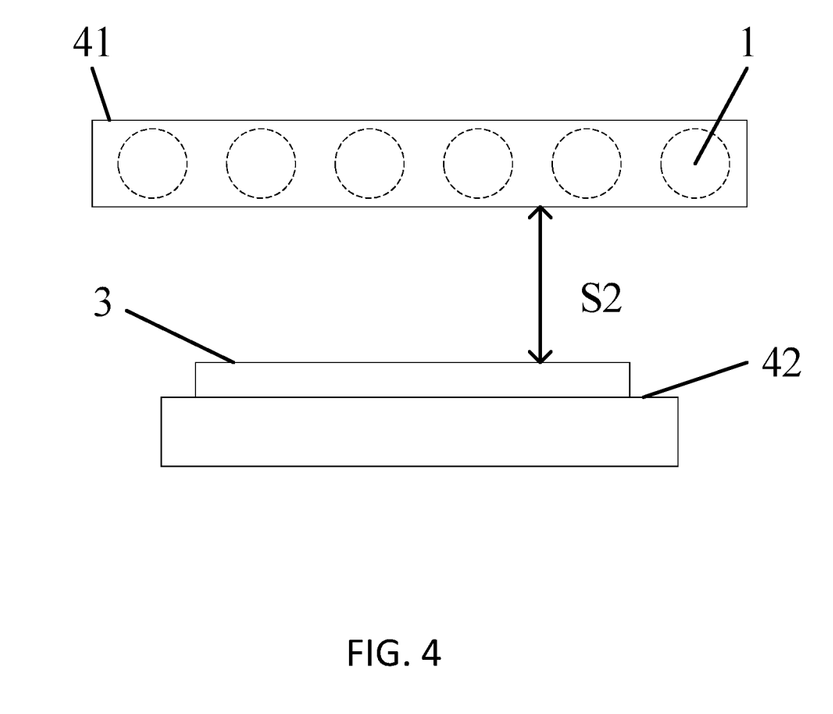
FIG. 4 is another schematic measuring diagram of the photomask thickness measurement device according to an exemplary embodiment of the disclosure.

FIGS. 3 and 4 are schematic measurement process diagrams of the mask thickness measuring device in an exemplary embodiment of the present disclosure. With reference to FIGS. 3 and 4, the working principle of the mask thickness measuring device is described as the following.

In some embodiments, the mask is mounted on the mask clamping robotic arm 42, the mask 3 can be moved in the machine by the robotic arm 42, and the mask thickness measuring device 1 is a fixed device arranged on the beam 41 of the machine. At the position, when there is no mask 3 entering the machine, the mask thickness measurement device 1 starts, the robotic arm 42 moves in a preset path, and the sensor in the mask thickness measurement device 1 measures the thickness of the mask without placing a mask on the robotic arm, the measured distance S1 is between the device 1 and the robotic arm 42. When the robotic arm 42 clamps the photomask 3 into the scanning area of the photomask thickness measurement device 1, the sensor in the photomask thickness measurement device 1 can measure every point on the top surface of the photomask 3 to be the distance S2 from the device. Then, the thickness value of each point on the mask is H=S2−S1.

The mask inspection system can generate a mask thickness map according to the thickness data of mask 3 detected by the mask thickness measurement device 1, and the maximum thickness of mask 3 can be graphically displayed through the mask thickness map. Update the thickness information of the above-mentioned mask 3 to the preset database, set the corresponding limits for the subsequent operation of the machine, set the no-permission access for the mask that exceeds the maximum allowable thickness of the mask, and prohibit the thickness-exceeding mask to enter the machine and resulting in disallowed sample height on the measurement arm.

The photomask inspection system includes a barcode reading device 2 and a calibration device among other parts.

The barcode reading device 2 and the mask thickness measuring device 1 are arranged opposite to each other at the entrance of the machine, and the barcode reading device 2 is used to read the barcode on the mask 3 to obtain the thickness information of the mask 3.

In some embodiments, the calibration device includes a calibration rod and an electromagnet, the calibration rod includes a calibration stick and a calibration base, the calibration stick is vertically disposed to the top surface of the calibration base, the electromagnet is disposed on the bottom of the calibration base, and the calibration device is used for calibrating the barcode reading device.

Figure 5:
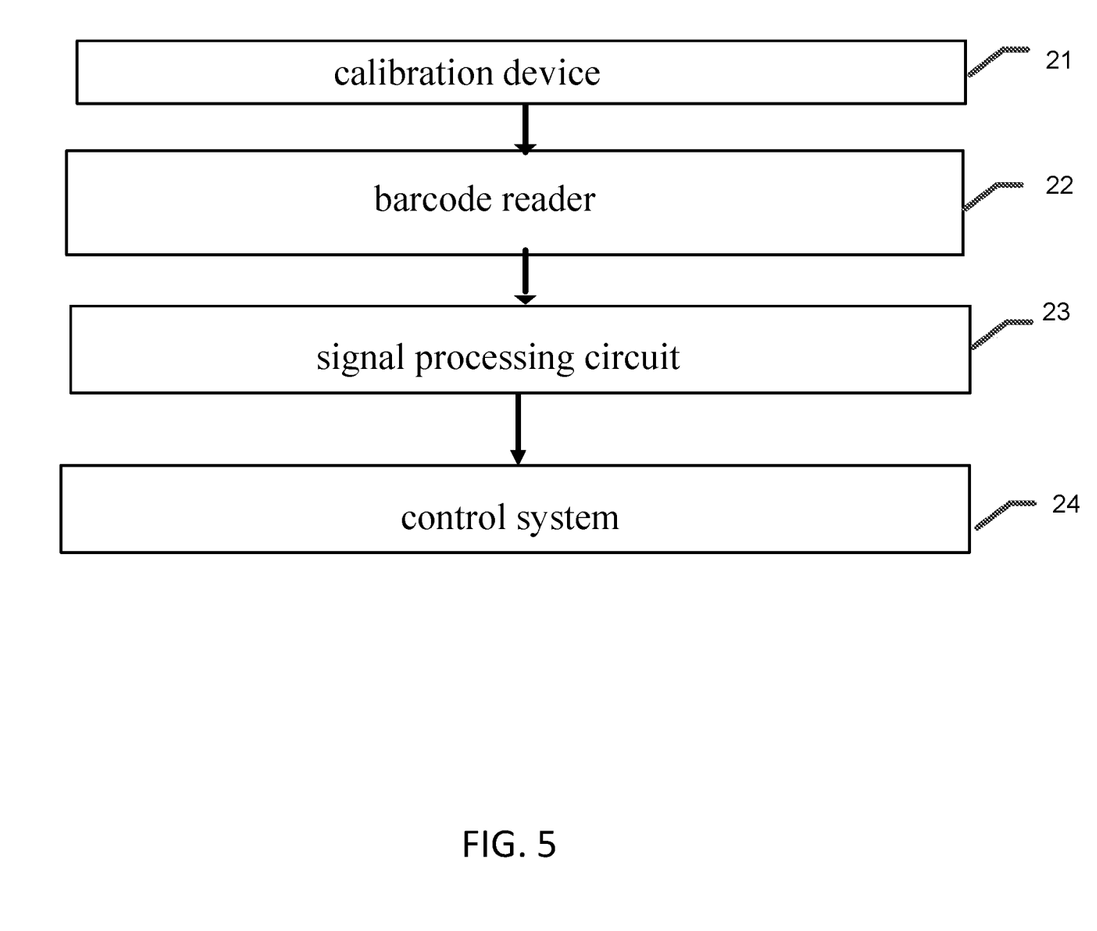
FIG. 5 is a schematic connection diagram of a calibration device according to an exemplary embodiment of the present disclosure.

FIG. 5 is a schematic connection diagram of a calibration device in an exemplary embodiment of the present disclosure. As shown in FIG. 5, the calibration device 21 is connected to the barcode reading device 2, and the barcode reading device 2 includes a barcode reader 22, a signal processing circuit 23 and a control system 24, the barcode reader 22 obtains the relevant information of the mask 3 by reading the barcode on the mask 3, which includes the thickness information of the mask 3, then the barcode reader 22 sends the above information to the signal processing circuit 23, the signal processing circuit 23 sends the received information to the control system 24 then, and the control system 24 operates on the barcode reader 22 by sending relevant instructions.

The calibration device 21 is arranged on the barcode reader 22 of the barcode reading device 2 on the one hand, and is connected to the signal processing circuit 23 on the other hand. When the barcode reader 22 reads the mask barcode abnormally, it can transmit the abnormal signal to the signal processing circuit 23, and then the control system 24 will turn on the calibration device 21 and feedback the information to the signal processing circuit 23. The signal processing circuit 23 calibrates the barcode reader 22 by controlling the calibration device 21. After the calibration is complete, the barcode reader 22 reads the mask barcode again to verify the calibration result of the calibration device 21. If the barcode reader 22 still reads the barcode abnormally, the calibration device 21 continues to calibrate until the barcode reader 22 can normally read the barcode of the photomask 3.

Figure 6:
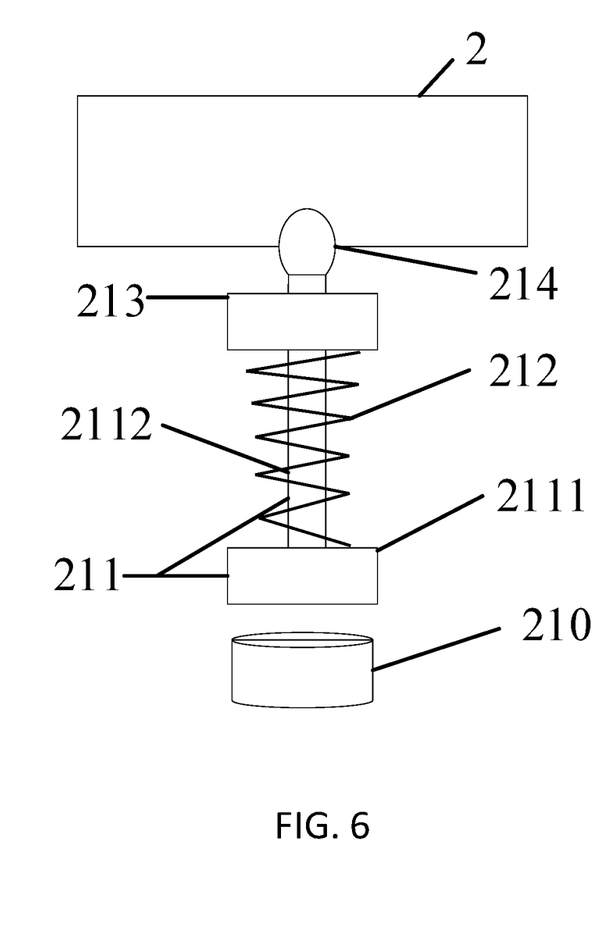
FIG. 6 is a schematic structural diagram of a calibration device according to an exemplary embodiment of the present disclosure.

In some embodiments, as shown in FIG. 6, the calibration device 21 includes a calibration rod 211 and an electromagnet 210, the calibration rod 211 includes a calibration stick 2112 and a calibration base 2111, the calibration stick 2112 is vertically disposed on the calibration base 2111, and the electromagnet 210 is set at the bottom of the calibration base 2111.

The barcode reading device 2 also includes a calibration button 214, and the barcode reading device 2 can be calibrated by pressing the calibration button 214; wherein, the calibration stick 2112 in the calibration device 21 can be a cylinder, and the diameter of the calibration stick 2112 needs to be less than or equal to the surface area of the calibration button 214 to ensure that the top of the calibration stick 2112 can press the calibration button 214 to calibrate the device; the calibration base 2111 has the shape of a circular plate, and the calibration base 2111 is vertically disposed to the calibration stick 2112. The calibration base 2111 has a polarity, which is the same as the electromagnet 210 after being powered on; their diameters are equal, and the electromagnet 210 is arranged in a non-contact manner under the bottom of the calibration base 2111; the calibration device 21 also includes a spring 212, which passes through the body of the calibration stick 2112 and has the same length as the calibration stick 2112.

Figure 7:
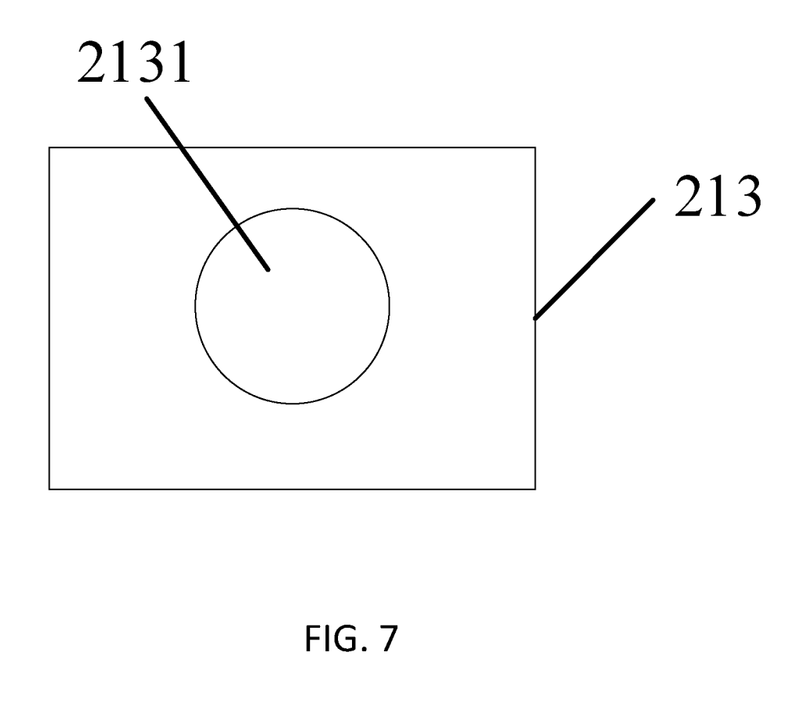
FIG. 7 is a schematic top view of a fixed baffle plate according to an exemplary embodiment of the disclosure.

The calibration device 21 further includes a fixed baffle 213. As shown in FIG. 7, the fixed baffle 213 is provided with a through hole 2131, the calibration stick 2112 penetrates through the through hole 2131 of the fixed baffle 213, and the fixed baffle 213 is set on the upper part of the calibration stick 2112, the fixed baffle 213 is provided on the barcode reading device 2 to provide a fixed position for the calibration device 21.

It should be noted that the calibration base 2111 in the calibration device 21 in the present disclosure matches the shape of the electromagnet 210, and the shape of the calibration base 2111 and the shape of electromagnet 210 may both be circular or others, for example, It can be rectangular or square, and the shape of the calibration base can be determined according to the shape of the selected electromagnet 210, which is not specifically limited in this disclosure. The present disclosure does not specifically limit how the two parts are connected; one end of the spring 212 can be fixed or not fixed on the calibration base 2111, and the specific connecting mechanism of the spring 212 can be determined according to actual use. The calibration device 21 can be integrated in the barcode reading device 2, or can be set outside the barcode reading device 2, which can be selected according to the actual design needs of the device.

In some specific embodiments, the calibration stick 2112 can be selected as a cylindrical rod with a length of 2-10 cm and a diameter of 4-12 mm, for example, the calibration stick 2112 can be a cylindrical rod with a length of 6 cm and a diameter of 8 mm; the calibration base 2111 can choose a round magnet with a diameter of 2-8 cm, for example, the calibration base 2111 can be a circular magnet with a diameter of 5 cm; spring 212 can be chosen as a spring with a length of 30-90 mm and a diameter of 20-80 mm, for example, spring 212 can have a length of 60 mm and a diameter of 50 mm; the fixed baffle 213 can have a plate-like structure with a length of 20-60 mm and a width of 20-60 mm with a through hole 2131, and the diameter of the through hole 2131 of the fixed baffle 213 can be selected to be greater than or equal to 8 mm, for example, the fixed baffle 213 can be a plate-like structure with a length of 40 mm and a width of 40 mm with a through hole; the electromagnet 210 can be selected as a round electromagnet with a voltage set at 24V, a stroke of 0-6 mm, and a thrust of 5-10N, with the holding force and its power is 38.5 W or 22.2 W, current is 1.6 A or 0.92 A, resistance is 15 ohms or 26 ohms, and the energized working cycle at 0-50 S. The mask inspection system includes a power supply. The power supply adopts a voltage regulator chip. The power supply can output a stable and uninterrupted power for the electromagnet, and can reasonably match the output of voltage and power. The power supply can use a voltage regulator chip, such as a 24V voltage regulator. The chip can output a stable uninterrupted 24V power supply, but the power supply type of the present disclosure is not limited to this, and can be determined according to actual use needs.

The calibration of the barcode reader is described in the below paragraph.

When the barcode reading device 2 reads the mask barcode abnormally, the calibration device 21 is activated to calibrate the barcode reading device 2, and the electromagnet 210 in the calibration device 21 is energized through the power supply, so that the electromagnet 210 has the same function as the calibration device. The base 2111 has the same polarity. Due to the repulsion, the electromagnet 210 pushes the calibration base 2111 forward, and drives the spring 212 to produce elastic deformation. The calibration button 214 is kept pressed for a certain period of time, the power is turned off, so that the electromagnet 210 loses electric power and polarity, and the repulsion between the electromagnet 210 and the calibration base 2111 disappears. Due to the elastic deformation of the spring 212, the calibration rod 211 returns to the initial position, and the calibration of the barcode reading device 2 is complete. After calibration, the barcode reading device 2 re-reads the barcode on those mask with abnormal barcode reading, to verify whether the calibration of the barcode reading device 2 is correct. If the calibration of the barcode reading device 2 fails, the above process is repeated to perform calibration again until the barcode reading device 2 can read the barcode normally, and the calibration process ends.

It should be noted that, in the above-mentioned calibration device 21, the electromagnet 210 is disposed at the bottom of the calibration rod 211, and the electromagnet 210 and the calibration rod 211 have the same polarity. Due to repulsion, the electromagnet 210 can move the calibration rod 211 bottom forward. In addition, the calibration device 21 can also be switched, so that the electromagnet 210 is arranged on top of the calibration rod 211, then the electromagnet 210 and the top of the calibration rod 211 have different polarities. So parts of opposite polarities attract each other, the electromagnet 210 can move forward to the calibration rod 211. So the present disclosure includes but is not limited to the above-mentioned calibration device 21 or a switched position calibration device 21.

Specifically, the above-mentioned calibration stick 2112 keeps pressing the calibration button for a certain period of time. For example, the certain period of time can be set to 1-5 S, or 3 S, but the disclosure does not specifically limit the length of time. The time can be determined according to specific usage requirements. When the electromagnet 210 pushes the calibration base 2111 to move forward, in some embodiments, the calibration base 2111 moves forward by 2-10 mm. It is related to the distance set between the barcode readers 22. If the calibration device 21 is far away from the barcode reader 22, the forward movement distance of the calibration base 2111 can be greater than 5 mm. If the calibration device 21 is closer from the barcode reader 22, the forward movement distance of the calibration base 2111 may be less than 5 mm.

In some embodiments, in addition to re-reading the barcode, the verification of the calibration result of the device can also be performed by starting the mask thickness measuring device 1 to verify that the thickness of the mask is compared with the thickness information of the mask in the preset database. If the thickness error of the mask is within a certain range, it is also possible to further determine whether the calibration result is successful.

In the mask inspection system of the present disclosure, by providing a mask thickness measuring device 1 and a barcode reading device 2 in the system, the mask thickness measuring device 1 can measure the thickness of the mask 3 by setting multiple sensor modules for measurement, the mask exceeding the allowable thickness is stopped from entering the machine, which ensures the normal operation of the mask 3 and the machine; the barcode reading device 2 is provided with a calibration device 21, which can read the barcode on the barcode reading device 2. When abnormal, the device is automatically calibrated, which shortens the update time of the machine, and the calibration speed will be fast and the calibration accuracy will be improved.

Figure 8:
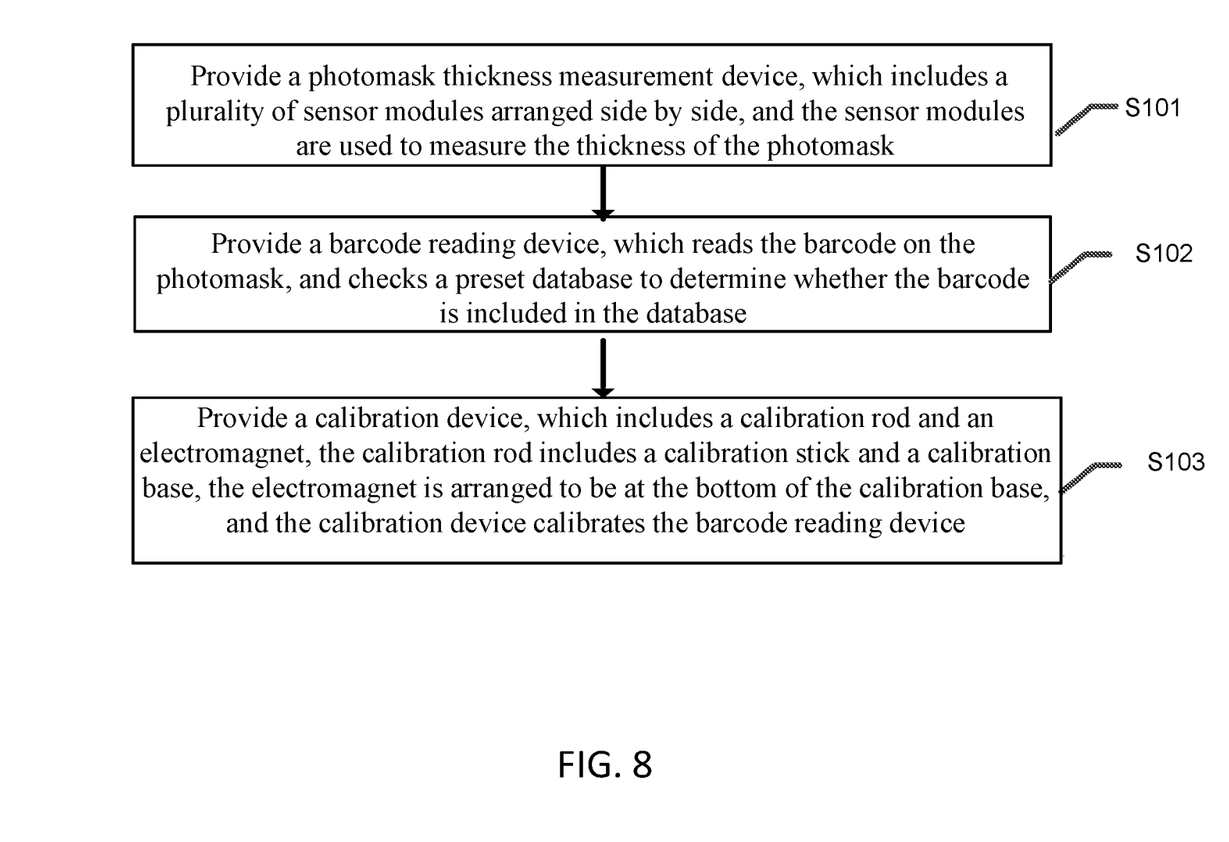
FIG. 8 is a schematic flowchart of a method for inspecting a photomask according to an exemplary embodiment of the present disclosure.

Another the embodiment of the present disclosure provides a photomask inspection method, as shown in FIG. 8, the method includes:

S101: provide a photomask thickness measurement device, which includes a plurality of sensor modules arranged side by side, and the sensor modules are used to measure the thickness of the photomask;

S102: provide a barcode reading device, which reads the barcode on the photomask, and checks a preset database to determine whether the barcode is included in the database;

S103: provide a calibration device, which includes a calibration rod and an electromagnet, the calibration rod includes a calibration stick and a calibration base, the electromagnet is arranged to at the bottom of the calibration base, and the calibration device is used to calibrate the barcode reading device.

The photomask inspection method is described as: a photomask thickness measurement device is provided, the photomask thickness measurement device includes a plurality of sensor modules arranged side by side, and the sensor modules are used to measure the thickness of the photomask; a bar code reading device is provided, and the bar code reading device is used to read the barcode on the photomask, and checks the preset database to determine whether the barcode is included in the database; provide a calibration device, the calibration device includes a calibration rod and an electromagnet, the calibration rod includes a calibration stick and a calibration base, the electromagnet is set to be at the bottom of the calibration base, and the barcode reading device is calibrated using the calibration device.

Figure 9:
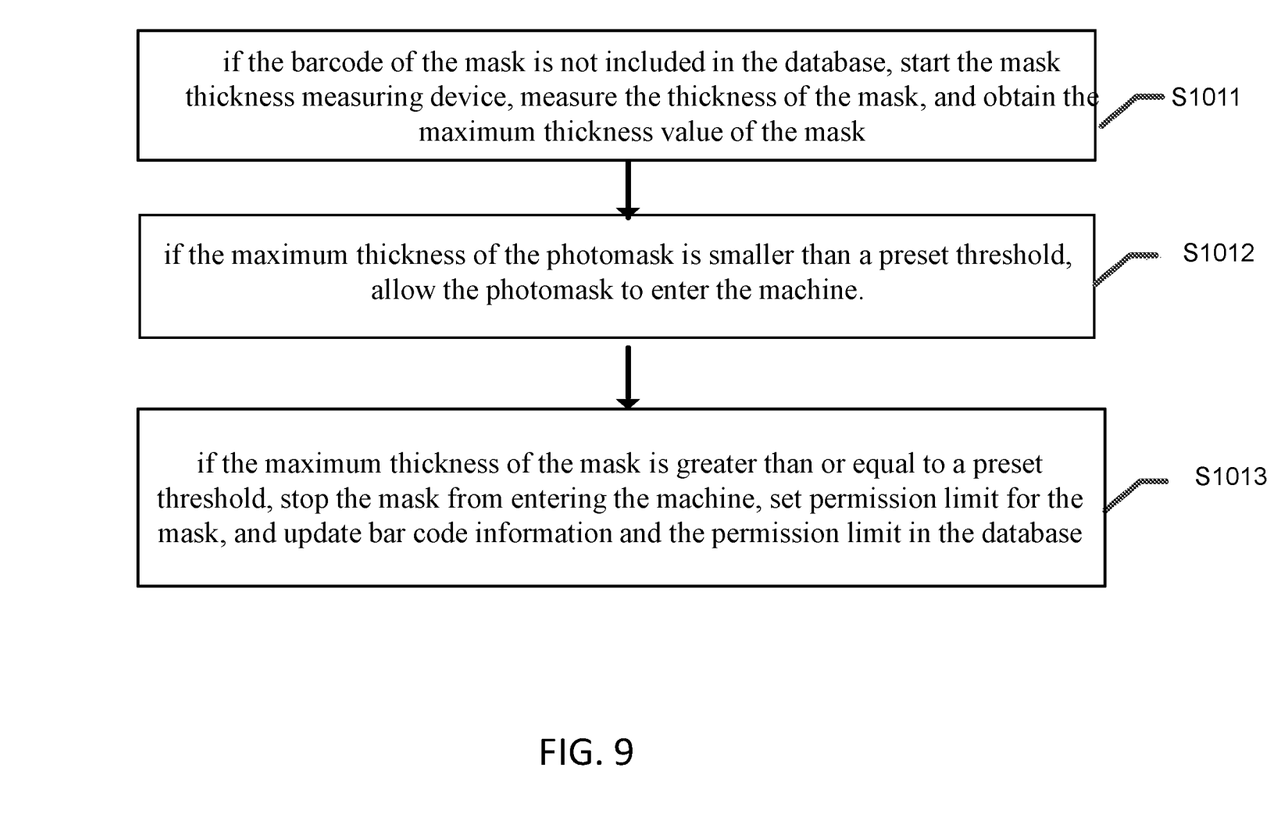
FIG. 9 is another schematic flowchart of a method for inspecting the photomask according to an exemplary embodiment of the present disclosure.

Herein, in step S102, to determine whether the barcode is included in the database, as shown in FIG. 9, includes the following steps:

Step S1011: if the barcode of the mask is not included in the database, start the mask thickness measuring device, measure the thickness of the mask, and obtain the maximum thickness value of the mask;

Step S1012: if the maximum thickness of the photomask is smaller than a preset threshold, allow the photomask to enter the machine.

Step S1013: if the maximum thickness of the mask is greater than or equal to a preset threshold, stop the mask from entering the machine, set permission limit for the mask, and update bar code information and the permission limit in the database.

Wherein, in step S1013, permission information is set on the mask, and the permission information of the mask includes stopping the mask from entering the machine, and may also include other information about the limitations of the mask, which is not specifically described in the present disclosure. The thickness information and the limitations information of the mask are updated to the database. After the machine subsequently obtains the mask information, the information in the database can be checked to compare the mask information with the information in the database. If the mask information has entered in the database, the mask can be quickly stopped from entering the machine, and the comparison method between the database and the mask information can quickly determine the permission limit of the mask and shorten the time for determining the status of the mask.

In addition, the information in the database of the present disclosure is not limited to the information set of the mask that is prohibited from entering the machine, the information of the database can also be the information set of the mask that is allowed to enter the machine, or the information of the database is the above two kinds of mask information. The database selection can be determined according to actual needs, which is not specifically limited in the present disclosure.

Herein, in step S102, the mask inspection method further includes: if the barcode reading device fails to read the barcode on the mask, starting the calibration device, calibrating the barcode reading device, and then re-read the barcode on the mask.

Figure 10:
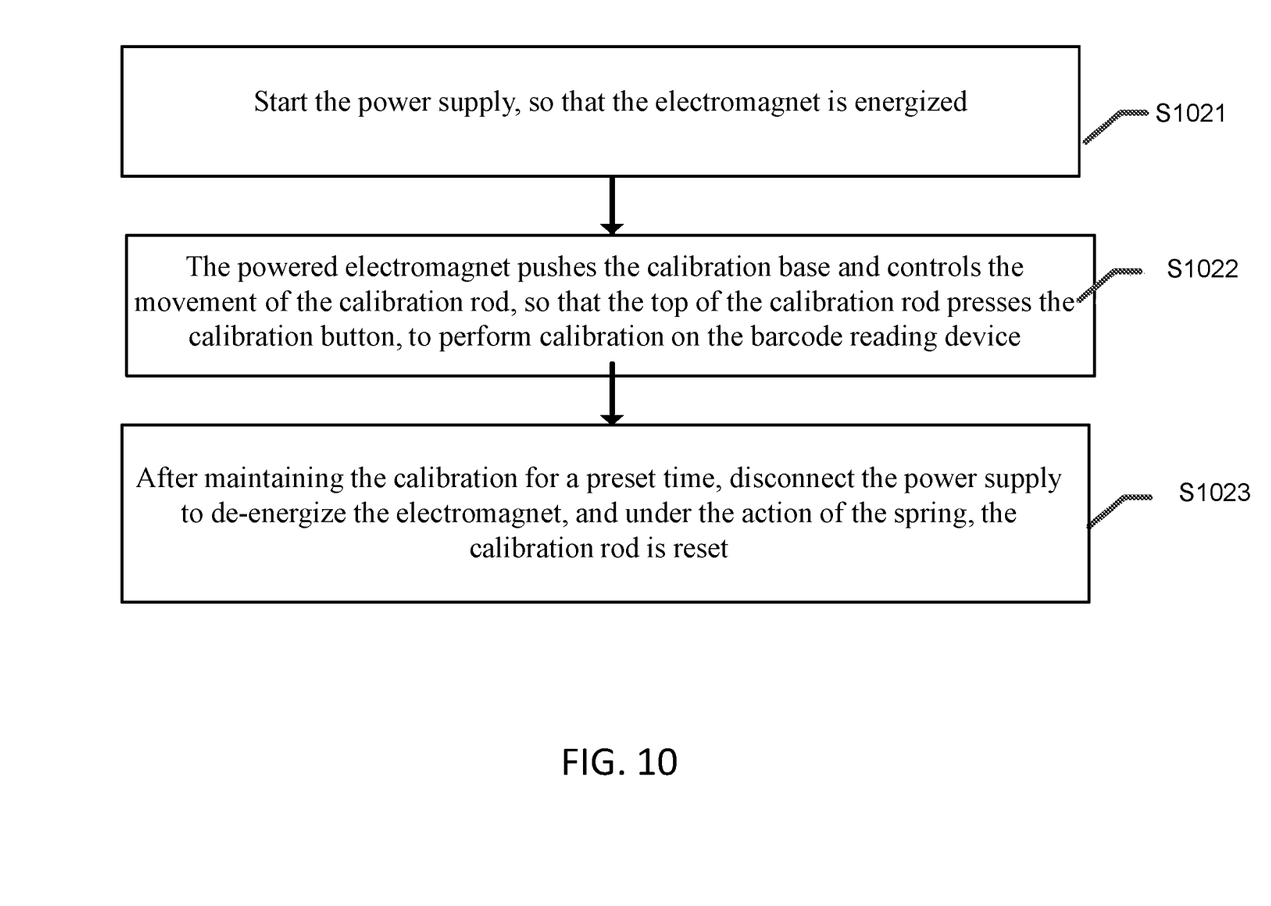
FIG. 10 is a working flow chart of a calibration device according to an exemplary embodiment of the present disclosure.

Herein, as shown in FIG. 10, calibrating the barcode reading device includes:

S1021: start the power supply, so that the electromagnet is energized;

S1022: after the electromagnet is powered on, the electromagnet pushes the calibration base and controls the movement of the calibration stick, so that the top of the calibration stick presses the calibration button on the barcode reading device, to perform calibration on the barcode reading device;

S1023: after maintaining the calibration for a preset time, disconnect the power supply to de-energize the electromagnet, and under the action of the spring, the calibration rod is reset.

The calibration method of the calibration device is described as the following: start the power supply to power the electromagnet; after the electromagnet is energized, the electromagnet pushes the calibration base to control the movement of the calibration stick, so that the top of the calibration rod presses the calibration button on the barcode reading device to read the barcode, to take the device for calibration; after maintaining the calibration for a preset time, disconnect the power supply to de-energize the electromagnet, and under the action of the spring, the calibration rod is reset.

In this embodiment, the electromagnet is set at the bottom of the calibration rod, and the electromagnet and the calibration rod have the same electric polarity. Due to repulsion, the electromagnet can push the bottom of the calibration rod to move forward, and press the calibration button to carry out barcode readers. In addition, the calibration device can also be switched, so that the electromagnet is placed on top of the calibration rod. The electromagnet and the top of the calibration rod have different electric polarities. So the opposite polarities attract each other, the electromagnet after powered on, can attract the calibration rod to move forward and press the calibration button to calibrate the barcode reading device. The present disclosure includes but is not limited to the calibration device and the switched calibration device.

Herein, in step S102, the mask inspection method further includes:

If the barcode reading device fails to read the barcode on the mask, the mask thickness measuring device is activated, and the mask thickness measuring device measures the thickness of the mask.

Figure 11:
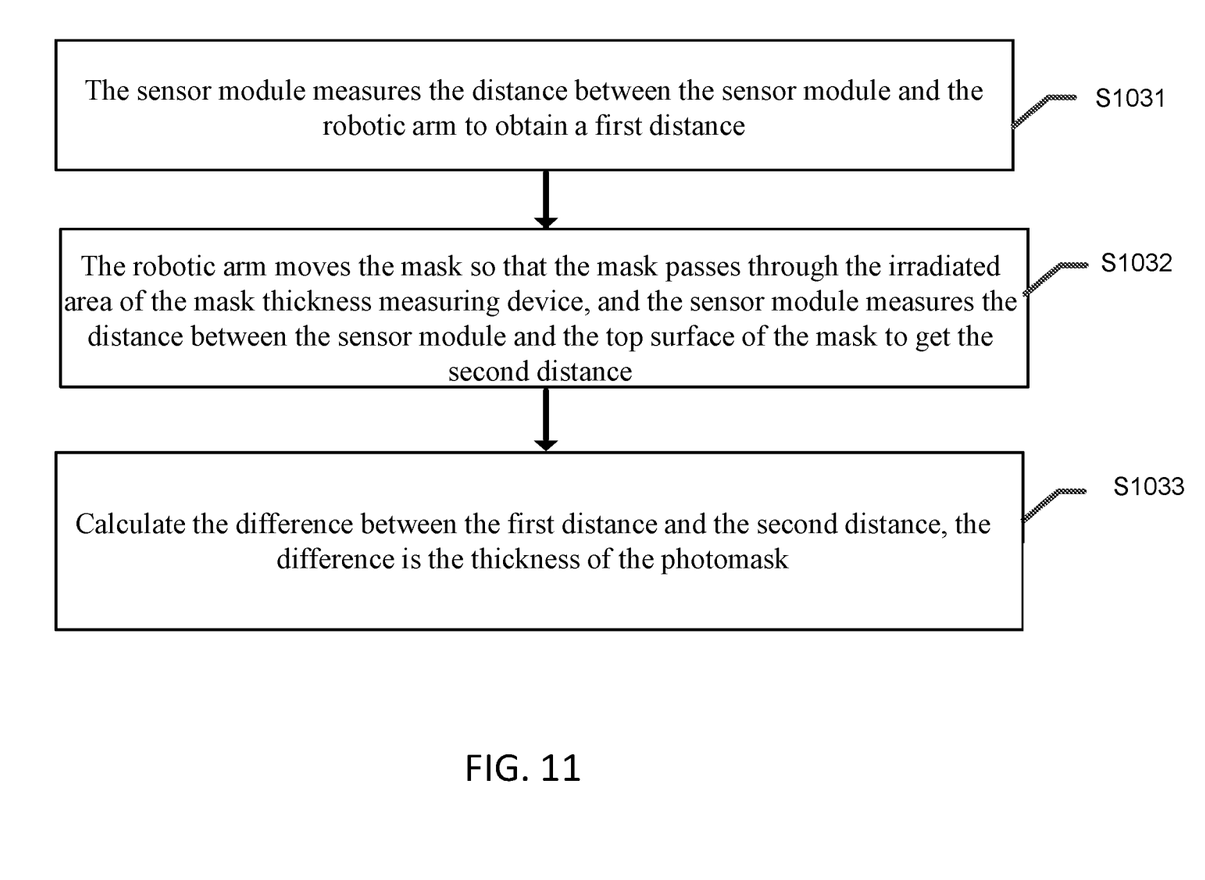
FIG. 11 is a working flow chart of a mask thickness measuring device in an exemplary embodiment of the present disclosure.

Among them, as shown in FIG. 11, the thickness of the photomask detected by the photomask thickness measuring device includes:

S1031: the sensor module measures the distance between the sensor module and the robotic arm to obtain a first distance;

S1032: the robotic arm moves the mask so that the mask passes through the irradiated area of the mask thickness measuring device, and the sensor module measures the distance between the sensor module and the top surface of the mask to get the second distance;

S1033: calculate the difference between the first distance and the second distance, the difference is the thickness of the photomask.

The method for measuring the thickness of the mask by the mask thickness measuring device is explained as follows: the sensor module measures the distance between the sensor module and the robotic arm to obtain the first distance S1; the robotic arm moves the mask so that the mask passes through the mask thickness measuring device, the sensor module measures the distance between the sensor module and the top surface of the mask to obtain the second distance S2; calculate the difference between the first distance S1 and the second distance S2, and the difference is the thickness of the mask, H=S2−S1.

The mask detection method provided by the present disclosure includes the mask thickness measurement device, the barcode reading device and the calibration device in the barcode reading device, wherein the mask information and the state of the barcode reading device is transmitted to the control system through the signal processing circuit, and is transmitted through the command of the control system, so that the mask inspection system can realize the above operation steps. Herein, the signal processing circuit and control system provided by the present disclosure can be other forms of circuit and system, which can realize the method of the present disclosure, or realize the transmission of signals or instructions, or realize the circuit control. The method is not specifically limited, as long as it meets the usage requirements of the present disclosure.

The mask inspection method provided by the present disclosure, on the one hand, when the barcode reading of the mask is abnormal, the mask thickness measuring device will be activated to measure the thickness of the mask, by comparing the thickness of the mask with the mask in the preset database information to determine whether the mask has permission to enter the machine.

On the other hand, when the barcode reading of the mask is abnormal, the system will turn on the calibration device to calibrate the barcode reading device, and will automatically verify the calibration result, and stop the calibration until the calibration is successful, fast, and has high accuracy of calibration results.

Thirdly, when a new mask enters the machine, the mask thickness measuring device will be activated to compare the thickness of the new mask with the maximum allowable thickness of the mask. If the thickness of the new mask is greater than or equal to the maximum allowable value, the new mask will be prohibited from entering the machine, and the information of the new mask will be updated to the preset database. At the same time, the prohibition permission will be set. If the thickness of the new mask is less than the maximum allowable thickness, the new mask is allowed to enter the machine. This method can further determine the limit of the mask, so as to prevent the mask that exceeds the limit from entering the machine to cause damage to the machine or the mask, thereby improving the quality of the barcode reading device and the mask. safety.

It should be noted that although the various steps of the photomask inspection method in the present disclosure are described in a specific order in the drawings, this does not require or imply that the steps must be performed in the specific order, or that all of the steps shown must be performed. Additionally or alternatively, certain steps may be omitted, multiple steps may be combined into one step for execution, and/or one step may be decomposed into multiple steps for execution, and the like.

Other embodiments of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the appended claims.

What is claimed is:

1. A photomask inspection system, comprising:
a thickness measuring device for a photomask, comprising a plurality of sensor modules arranged side by side, wherein the plurality of sensor modules measures a thickness of the photomask;
a barcode reading device, configured to read a barcode on the photomask to obtain the thickness of the photomask, wherein the barcode reading device and the thickness measuring device are disposed opposite to each other; and
a calibration device, configured to calibrate the barcode reading device, wherein the calibration device comprises a calibration rod and an electromagnet, wherein the calibration rod comprises a calibration stick and a calibration base, and wherein the electromagnet is arranged at a bottom of the calibration base.

2. The photomask inspection system according to claim 1, wherein the calibration stick is attached to a top surface of the calibration base.

3. The photomask inspection system according to claim 1, wherein the bar code reading device further comprises a calibration button, wherein the calibration stick calibrates the bar code reading device by touching the calibration button.

4. The photomask inspection system according to claim 3, wherein a diameter of the calibration rod is less than or equal to a diameter of the calibration button.

5. The photomask inspection system according to claim 1, further comprising a power supply, wherein the power supply adopts a voltage regulator chip, wherein the power supply provides a voltage for the electromagnet, and wherein the electromagnet generates an electric polarity after being energized by the power supply.

6. The photomask inspection system according to claim 1, wherein both of a shape of the calibration base and a shape of the electromagnet comprise a circle, and wherein a diameter of the calibration base is equal to a diameter of the electromagnet.

7. The photomask inspection system according to claim 1, wherein an electric polarity of the calibration base is a same as the electric polarity of the electromagnet after being energized.

8. The photomask inspection system of claim 1, wherein the calibration base and the electromagnet are connected in a non-contact manner.

9. The photomask inspection system of claim 1, wherein the calibration device further comprises a spring, which passes through the calibration stick.

10. The photomask inspection system according to claim 9, wherein a length of the spring is equal to a length of the calibration stick.

11. The photomask inspection system of claim 1, wherein the calibration device further comprises a fixed baffle and a through hole made on the fixed baffle, wherein the calibration stick is inserted through the through hole.

12. The photomask inspection system of claim 11, wherein the fixed baffle is arranged on a top of the calibration stick.

13. The photomask inspection system of claim 1, wherein the plurality of sensor modules comprises a reflective photoelectric sensor.

14. A method for inspecting a photomask, comprising:
providing a thickness measuring device for the photomask, wherein the thickness measuring device comprises a plurality of sensor modules arranged side by side, wherein the plurality of sensor modules measures a thickness of the photomask;
providing a barcode reading device to read a barcode on the photomask, wherein the barcode reading device checks a preset database to determine whether the barcode is included in the database; and
providing a calibration device, wherein the calibration device comprises a calibration rod and an electromagnet, wherein the calibration rod comprises a calibration stick and a calibration base, wherein the electromagnet is arranged to be at a bottom of the calibration base, and wherein the barcode reading device is calibrated by the calibration device.

15. The method for inspecting the photomask according to claim 14, wherein:
to determine whether the barcode is included in the database comprises:
if the barcode of the photomask is not included in the database, start the thickness measuring device for the photomask, measure the thickness of the photomask, and obtain a maximum thickness value of the photomask; and
if the maximum thickness value of the photomask is smaller than a preset threshold, the photomask is allowed to enter the machine.

16. The method for inspecting the photomask according to claim 15, wherein:
if the maximum thickness of the photomask is greater than or equal to a preset threshold, the photomask is prohibited from entering the machine, and wherein a permission information is set for the photomask, and wherein the barcode information and the permission information of the photomask are updated to the database.

17. The method for inspecting the photomask according to claim 14, further comprising:
if the barcode reading device fails to read the barcode on the photomask, activating the calibration device to calibrate the barcode reading device, and having the calibrated barcode reading device to re-read the barcode on the photomask.

18. The method for inspecting the photomask according to claim 17, wherein:
to calibrate the barcode reading device comprises:
turning on a power supply to energize the electromagnet;
after being powered on, the electromagnet pushes the calibration base to control movement of the calibration rod, so that a top of the calibration rod presses a calibration button on the barcode reading device to calibrate the barcode reading device; and
after the calibration is maintained for a predetermined time, the power supply is disconnected to de-energize the electromagnet, and the calibration rod is reset under an action of a spring.

19. The method for inspecting the photomask according to claim 14, further comprising:
if the barcode reading device fails to read the barcode on the photomask, the thickness measuring device for the photomask is activated, to measure the thickness of the photomask.

20. The method for inspecting the photomask according to claim 14, wherein:
the plurality of sensor modules measuring the thickness of the photomask comprises:
measuring a distance between one of the plurality of the sensor modules and a robotic arm to obtain a first distance;
moving the photomask by the robotic arm so that the photomask passes through an irradiated area of the thickness measuring device for the photomask, wherein the plurality of sensor modules measures the distance between one of the plurality of sensor modules and a top surface of the photomask, to get a second distance; and
calculating a difference between the first distance and the second distance, wherein the difference is the thickness of the photomask.

* * * * *